United States Patent
Kanekawa et al.

(10) Patent No.: US 12,401,186 B2
(45) Date of Patent: Aug. 26, 2025

(54) ELECTRONIC CONTROL SYSTEM AND ELECTRONIC CONTROL DEVICE

(71) Applicant: Hitachi Astemo, Ltd., Ibaraki (JP)

(72) Inventors: Nobuyasu Kanekawa, Tokyo (JP); Takao Fukuda, Ibaraki (JP); Hiroshi Nakano, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 138 days.

(21) Appl. No.: 18/283,902

(22) PCT Filed: Feb. 2, 2022

(86) PCT No.: PCT/JP2022/004040
§ 371 (c)(1),
(2) Date: Sep. 25, 2023

(87) PCT Pub. No.: WO2022/224535
PCT Pub. Date: Oct. 27, 2022

(65) Prior Publication Data
US 2024/0170949 A1    May 23, 2024

(30) Foreign Application Priority Data

Apr. 20, 2021  (JP) ................................ 2021-071312

(51) Int. Cl.
*H02H 5/04* (2006.01)
*G01R 19/165* (2006.01)
(Continued)

(52) U.S. Cl.
CPC ......... *H02H 5/041* (2013.01); *H02J 7/00304* (2020.01); *H02J 7/00309* (2020.01)

(58) Field of Classification Search
CPC .. H02H 5/04; H02J 7/00; G01R 31/26; G01R 19/165
See application file for complete search history.

(56) References Cited

U.S. PATENT DOCUMENTS

2012/0130576 A1  5/2012  Sugiyama et al.
2013/0147407 A1  6/2013  Kawamura
(Continued)

FOREIGN PATENT DOCUMENTS

JP    05-260644 A    10/1993
JP    2010-226782 A  10/2010
(Continued)

OTHER PUBLICATIONS

International Search Report of PCT/JP2022/004040 dated Mar. 8, 2022.

*Primary Examiner* — Neel D Shah
(74) *Attorney, Agent, or Firm* — MATTINGLY & MALUR, PC

(57) ABSTRACT

An electronic control system includes first through third measurement units that measure current, temperature and current or temperature, respectively. An electronic control device controls an operation of a power semiconductor element by using measurement results of the first through third measurement units. At least a part of the power semiconductor element incorporates the first and second measurement units, and the electronic control device estimates temperature from a measured value of the current. Whether the first measurement unit, the second measurement unit, and the third measurement unit are normal or abnormal on a basis of a measured value of the first measurement unit is determined, and an abnormality is determined of at least one of the power semiconductor element and a wire harness through which an output current of the power semiconductor element flows according to a measurement result of the measurement unit determined to be normal.

14 Claims, 16 Drawing Sheets

(51) Int. Cl.
*G01R 31/26* (2020.01)
*H02J 7/00* (2006.01)

(56) References Cited

U.S. PATENT DOCUMENTS

| | | |
|---|---|---|
| 2013/0229840 A1 | 9/2013 | Nakamori |
| 2014/0107881 A1 | 4/2014 | Sugiyama et al. |
| 2020/0233040 A1* | 7/2020 | Liu .................... G01K 3/06 |

FOREIGN PATENT DOCUMENTS

| | | |
|---|---|---|
| JP | 2012-075234 A | 4/2012 |
| JP | 2013-183595 A | 9/2013 |
| JP | 2016-082641 A | 5/2016 |
| WO | 2015/059735 A1 | 4/2015 |

* cited by examiner

FIG. 2

| Case | A:B | B:C | C:A | STATE | SENSOR SELECTION |
|---|---|---|---|---|---|
| 1 | ≈ | ≈ | ≈ | ALL ABNORMAL | A |
| 2 | ≈ | ≠ | ≠ | C ANOMALY | A |
| 3 | ≠ | ≠ | ≈ | B ANOMALY | A |
| 4 | ≠ | ≈ | ≠ | A ANOMALY | B |
| 5 | else | | | COMPLEX ABNORMAL | CURRENT CUTOFF |

FIG. 3

| Case | A:B | B:C | C:A | STATE | SENSOR SELECTION |
|---|---|---|---|---|---|
| 1 | ≈ | ≈ | ≈ | ALL ABNORMAL | (A+B+C)/3 |
| 2 | ≈ | ≠ | ≠ | C ABNORMAL | (A+B)/2 |
| 3 | ≠ | ≠ | ≈ | B ABNORMAL | (A+C)/2 |
| 4 | ≠ | ≈ | ≠ | A ABNORMAL | (B+C)/2 |
| 5 | else | | | COMPLEX ABNORMAL | CURRENT CUTOFF |

FIG. 4

| Case | A:B | B:C | C:A | STATE | SENSOR SELECTION |
|---|---|---|---|---|---|
| 1 | ≈ | ≈ | ≈ | ALL ABNORMAL | MEDIAN OF A, B, C |
| 2 | ≈ | ≠ | ≠ | C ABNORMAL | (A+B)/2 |
| 3 | ≠ | ≠ | ≈ | B ABNORMAL | (A+C)/2 |
| 4 | ≠ | ≈ | ≠ | A ABNORMAL | (B+C)/2 |
| 5 | else | | | COMPLEX ABNORMAL | CURRENT CUTOFF |

FIG. 8
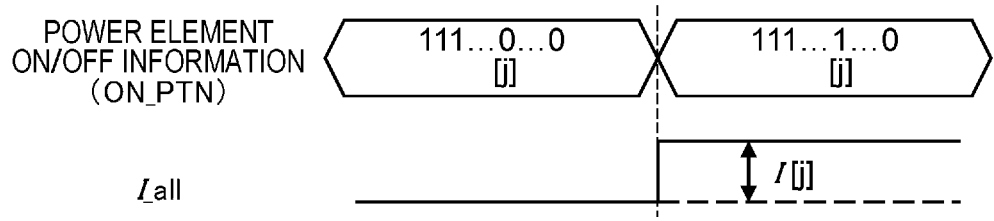
(1) PURE RESISTANCE LOAD
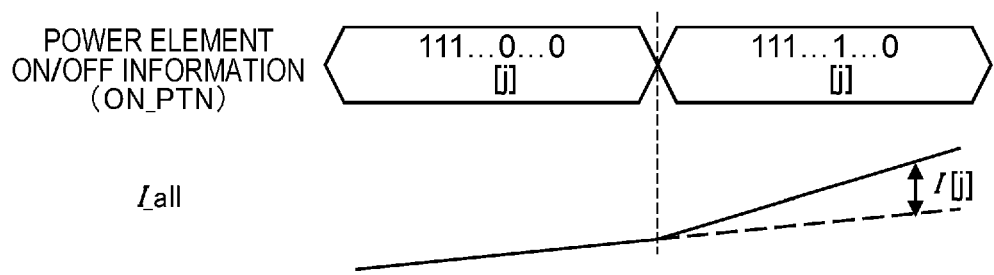
(2) INDUCTIVE LOAD
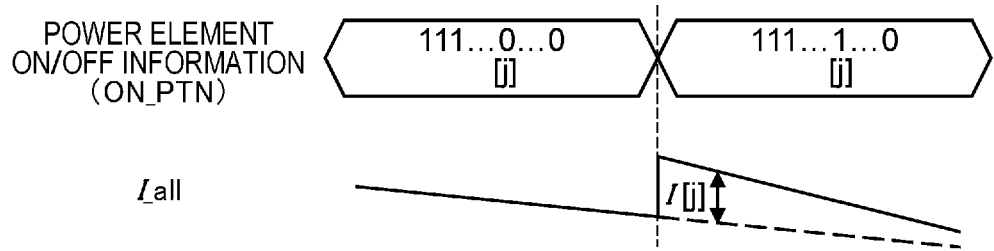
(3) CAPACITIVE LOAD
FIG. 9
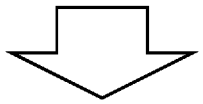

ELECTRONIC CONTROL SYSTEM AND ELECTRONIC CONTROL DEVICE

INCORPORATION BY REFERENCE

The present application claims the priority of Japanese Patent Application No. 2021-71312, which is a Japanese application filed on Apr. 20, 2021, and incorporates it into this application by referring to its contents.

TECHNICAL FIELD

The present invention relates to an electronic control device, and particularly to overheat protection of a power semiconductor element and a wire harness due to overcurrent.

BACKGROUND ART

Conventionally, protection elements such as a fuse, a temperature fuse, and a poly switch are used to prevent overheating, smoking, and fire due to overcurrent of an electronic device. In addition, there are an intelligent power module (IPM) and an intelligent power device (IPD) in which a power semiconductor element has a function of detecting and protecting its own overheating by a built-in current sensor or temperature sensor.

Background art of the present technical field includes the following prior art. PTL 1 (Japanese Patent Application Laid-Open No. 2010-226782) discloses a hybrid construction machine including: a battery; an inverter unit including an IPM and an inverter circuit that drives a slewing motor; a step-up/down converter unit including an IPM and a step-up/down converter that charges and discharges the battery; and a controller that controls the inverter circuit and the step-up/down converter, in which the inverter unit and the step-up/down converter unit include a temperature sensor for detecting a temperature of the IPM outside the IPM, separately from a temperature sensor incorporated in the IPM, and the controller reduces a maximum drive current to the slewing motor or reduces a maximum discharge current from the battery when a temperature detection result by an external temperature sensor exceeds a predetermined threshold.

In addition, PTL 2 (Japanese Patent Application Laid-Open No. 2013-183595) discloses a semiconductor device for a power conversion circuit (IPM) that uses a comparator to determine overheating by comparing a forward drop voltage of a temperature detecting diode with a reference value, inputs the voltage to a series regulator circuit using an amplifier and a resistor, and outputs an output voltage of the series regulator circuit to a temperature information external terminal as temperature information.

PTL 3 (WO 2015/059735 A) discloses a power supply device including: a power supply control unit that outputs a PWM signal having a duty ratio corresponding to a difference between a voltage of a DC system power supply and a preset target voltage; and a power supply circuit that includes a switching element to which a heat sink is attached, switches the switching element on the basis of the PWM signal, and outputs the DC system power supply from an AC power supply provided from the outside, in which the power supply control unit activates a protection mechanism of the power supply circuit in response to a period in which a rate of change in temperature information obtained from a first temperature sensor attached to the heat sink is equal to or greater than a protection start temperature change rate becoming equal to or greater than a preset protection start threshold time.

SUMMARY OF INVENTION

Technical Problem

Among the background arts described above, according to PTL 2, since the temperature of the semiconductor element can be known outside the IPM, it is not necessary to provide a temperature sensor outside as in PTL 1, and according to PTL 3, since the temperature of the semiconductor junction can be estimated with higher accuracy, reliable overheat protection can be performed with higher accuracy.

In addition, although the semiconductor element can be protected from overheating in the above-described background art, it is desired to be able to cope with overheat protection of a wire harness through which a current controlled by the semiconductor element flows and sensor failure.

Therefore, an object of the present invention is to realize an overheat protection function capable of coping with overheat protection of a wire harness and sensor failure in addition to overheat protection of a semiconductor element.

Solution to Problem

A representative example of the invention disclosed in the present application is as follows. That is, provided is an electronic control system including: a first measurement unit that measures current; a second measurement unit that measures temperature; a third measurement unit that measures current or temperature; a power semiconductor element that controls power supply to a load; and an electronic control device that controls an operation of the power semiconductor element by using measurement results of the first measurement unit, the second measurement unit, and the third measurement unit, in which at least a part of the power semiconductor element incorporates the first measurement unit and the second measurement unit, and the electronic control device estimates temperature from a measured value of the current, determines whether the first measurement unit, the second measurement unit, and the third measurement unit are normal or abnormal on a basis of a measured value of the first measurement unit, a measured value of the second measurement unit, and a measured value of the third measurement unit, and detects an abnormality of at least one of the power semiconductor element and a wire harness through which an output current of the power semiconductor element flows according to a measurement result of the measurement unit determined to be normal.

Advantageous Effects of Invention

According to one aspect of the present invention, abnormality of the power semiconductor element and the wire harness can be detected. Problems, configurations, and effects other than those described above will be clarified by the following description of embodiments.

BRIEF DESCRIPTION OF DRAWINGS

FIG. 2 is a diagram illustrating an operation example of a selection unit.

FIG. 3 is a diagram illustrating an operation example of the selection unit.

FIG. 4 is a diagram illustrating an operation example of the selection unit.

FIG. 8 is a diagram illustrating an operation principle of an individual current calculating unit.

FIG. 9 is a diagram illustrating ON/OFF timing of a power semiconductor element.

DESCRIPTION OF EMBODIMENTS

First, an outline of an embodiment of the present invention will be described.

(1) In addition to a built-in temperature sensor and a built-in current sensor 101-1 incorporated in a power semiconductor element 100-1 or the like, an external current sensor 201-1 is provided outside the power semiconductor element 100-1 or the like.

Then, for fail-operational in which the operation can be continued even if one sensor fails, the following configuration is adopted.

(2) The power semiconductor element temperature estimating unit estimates the temperature from the measured value of the built-in current sensor 101-1 and the measured value of the external current sensor 201-1, compares three of these temperature estimated values with the measured value of the built-in temperature sensor, and determines that the temperature is normal when the temperature estimated value is within a predetermined error range, and determines that the temperature is abnormal when there is a difference exceeding the predetermined error range.

(3) Abnormality of the power semiconductor element 100-1 or the like is detected based on the temperature value determined to be normal, the temperature of the wire harness 300 is estimated based on the current value determined to be normal, and abnormality of the wire harness 300 is detected and protected from heating based on the temperature estimated value.

In order to perform fail-safe operation on the safety side when one sensor fails, the following configuration is adopted.

(2) The temperature is estimated by the power semiconductor element temperature estimating unit from the measured value of the external current sensor 201-1.

(3) Abnormality of the power semiconductor element 100-1 or the like is detected based on a larger one of the measured value of the built-in temperature sensor and the temperature estimated value based on the measured value of the external current sensor 201-1, the temperature of the wire harness 300 is estimated based on the larger one of the measured value of the built-in current sensor 101-1 and the measured value of the external current sensor 201-1, and the abnormality of the wire harness 300 is detected and protected from heating based on the temperature estimated value.

Hereinafter, embodiments of the present invention will be described with reference to the drawings.

First Embodiment

Figure 1:
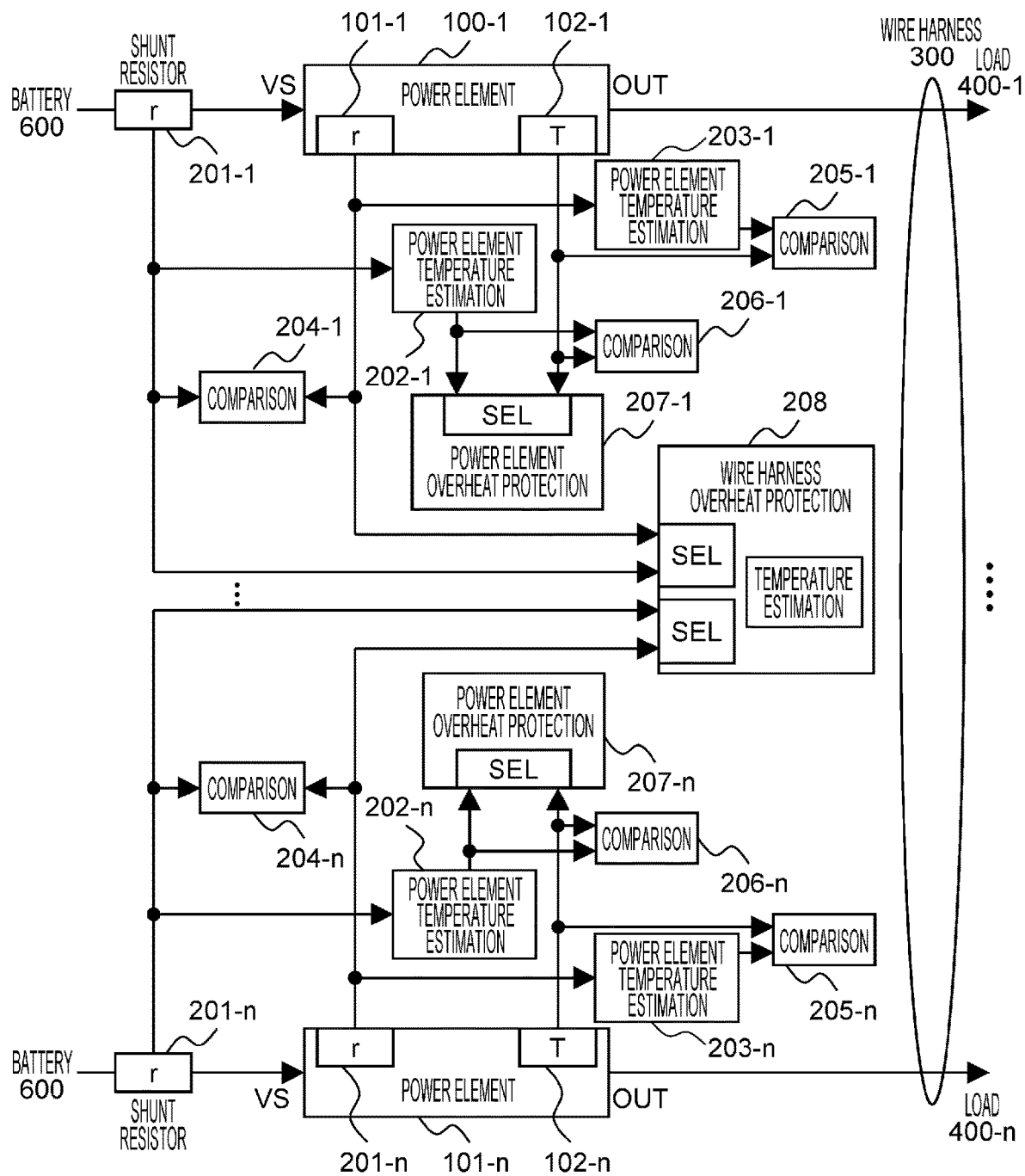
FIG. 1 is a diagram illustrating a configuration of an electronic control system according to a first embodiment.

FIG. 1 is a diagram illustrating a configuration of an electronic control system according to a basic embodiment of the present invention.

Power semiconductor elements 100-1 to 100-n control ON/OFF of power from an auxiliary battery 600 according to a command from a microprocessor 250 (see FIG. 5), and control power supply to loads 400-1 to 400-n via a wire harness 300. In many cases, the wire harness 300 is configured by bundling a plurality of electric wires, and includes a line that supplies power to a load in the bundle, a signal line that exchanges a signal, or a communication line.

Current sensors 101-1 to 101-n and temperature sensors 102-1 to 102-n are incorporated in the power semiconductor elements 100-1 to 100-n, respectively. Shunt resistors are provided as current sensors 201-1 to 201-n outside the power semiconductor elements 100-1 to 100-n. Power element temperature estimating units 202-1 to 202-n estimate the temperatures of the power semiconductor elements 100-1 to 100-n based on the voltage drop across the shunt resistors as the current sensors 201-1 to 201-n. Power element temperature estimating units 203-1 to 203-n estimate the temperatures of the power semiconductor elements 100-1 to 100-n based on the outputs of the current sensors 101-1 to 101-n incorporated in the power semiconductor elements 100-1 to 100-n.

Comparison units 205-1 to 205-n compare the estimated temperatures (temperatures estimated from the measured value of the built-in current sensor 101-1 to 101-n) by the power element temperature estimating units 203-1 to 203-n with the outputs of the temperature sensors 102-1 to 102-n incorporated in the power semiconductor elements 100-1 to 100-n. Comparison units 206-1 to 206-n compare the estimated temperatures (temperatures estimated from the measured values of the shunt resistors) by the power element temperature estimating units 202-1 to 202-n with the outputs of the temperature sensors 102-1 to 102-*n* incorporated in the power semiconductor elements 100-1 to 100-*n*.

Power element overheat protecting units 207-1 to 207-*n* select a temperature value estimated to be normal by a selection unit SEL on the basis of the comparison results by the comparison units 204-1 to 204-*n*, 205-1 to 205-*n*, and 206-1 to 206-*n*, detect an abnormality of the power element, and protect the power element from overheating. A wire harness overheat protecting unit 208 selects a temperature value estimated to be normal by the selection unit SEL on the basis of the comparison results by the comparison units 204-1 to 204-*n*, 205-1 to 205-*n*, and 206-1 to 206-*n*, detects an abnormality of the wire harness 300, and protects the wire harness 300 from overheating.

Specifically, the power element overheat protecting units 207-1 to 207-*n* notify a warning or reduce the output current when the input (actually measured value or estimated value of the temperature of the power semiconductor elements 100-1 to 100-*n*) selected by the selection unit SEL approaches a predetermined temperature, and cut off the current when the temperature exceeds the predetermined temperature. The wire harness overheat protecting unit 208 estimates the temperature of the wire harness 300 from the input (actually measured value of the current) selected by the selection unit SEL, notifies a warning or reduces the output current when the estimated value approaches a predetermined temperature, and cuts off the current when the estimated value exceeds the predetermined temperature.

FIGS. 2 to 4 are diagrams illustrating operation examples of the selection units SEL of the power element overheat protecting units 207-1 to 207-*n* and the wire harness overheat protecting unit 208. A, B, and C indicate the respective sensors. For example, sensors A are the current sensors 201-1 to 201-*n*, sensors B are the current sensors 101-1 to 101-*n*, and sensors C are the temperature sensors 102-1 to 102-*n*. In addition, A: B indicates comparison results between the current sensors 201-1 to 201-*n* and the current sensors 101-1 to 101-*n*, that is, outputs of the comparison units 204-1 to 204-*n*. Similarly, B: C indicates comparison results between the current sensors 101-1 to 101-*n* and the temperature sensors 102-1 to 102-*n*, that is, outputs of the comparison units 205-1 to 205-*n*, and C: A indicates comparison results between the temperature sensors 102-1 to 102-*n* and the current sensors 201-1 to 201-*n*, that is, outputs of the comparison units 206-1 to 206-*n*. "≈" indicates that both values are within a predetermined tolerance range, and "≠" indicates that both values are outside the tolerance range.

FIG. 2 illustrates an example in which priority is given to sensor A>sensor B>sensor C in this order. Since the current sensors 101-1 to 101-*n* which are the sensors B and the temperature sensors 102-1 to 102-*n* which are the sensors C are incorporated in the power semiconductor elements 100-1 to 100-*n*, a common cause failure may occur. Therefore, it is desirable to prioritize the outputs of the current sensors 201-1 to 201-*n*, which are the sensors A provided outside the power semiconductor elements 100-1 to 100-*n*. In addition, since the temperature sensors 102-1 to 102-*n*, which are the sensors C, are delayed due to the thermal responses of the power semiconductor elements 100-1 to 100-*n*, it is desirable to prioritize the outputs of the current sensors 101-1 to 101-*n*, which are the sensors B, rather than the temperature sensors 102-1 to 102-*n*, which are the sensors C. In Case 1, since all the sensors are normal, the sensors A with high priority are selected. In Case 2, since the sensors A and B are normal and the sensors C are abnormal, the sensors A with high priority are selected. In Case 3, since the sensors A and C are normal and the sensors B are abnormal, the sensors A with high priority are selected. In Case 4, since the sensors B and C are normal and the sensors A are abnormal, the sensors B having the second highest priority after the sensors A are selected. In Case 5, at least two sensors are abnormal, and a normal sensor cannot be specified. Therefore, the current is cut off in a preventive manner.

FIG. 3 is an example of taking an average value of values of sensors determined to be normal, and FIG. 4 is an example of adopting an intermediate value in a case where three sensors are determined to be normal (Case 1), and adopting an average value in a case where two sensors are determined to be normal (Cases 2 to 4).

Since a delay from the increase in the current has already occurred at the time when the temperature of the power element changes due to the increase in the current, it is desirable that the wire harness overheat protecting unit 208 estimate the temperature of the wire harness 300 from the current value rather than estimate the temperature of the wire harness 300 from the power element temperature from the viewpoint of the responsiveness of the protection operation. Therefore, among the examples of FIGS. 2 to 4 described above, the example of FIG. 3 is desirable.

As for the power element overheat protecting units 207-1 to 207-*n*, there are no superiority or inferiority among the examples of FIGS. 2 to 4 described above from the viewpoint of quick responsiveness of the protection operation. On the other hand, from the viewpoint of reducing the measurement error, the examples of FIGS. 3 and 4 in which the average value or the intermediate value is adopted are desirable. In addition, in addition to the examples of FIGS. 2 to 4, there is a method of adopting an intermediate value of values of three sensors. However, in this method, it is not possible to cope with Case 5: a case where at least two sensors are abnormal and a normal sensor cannot be specified.

Figure 5:
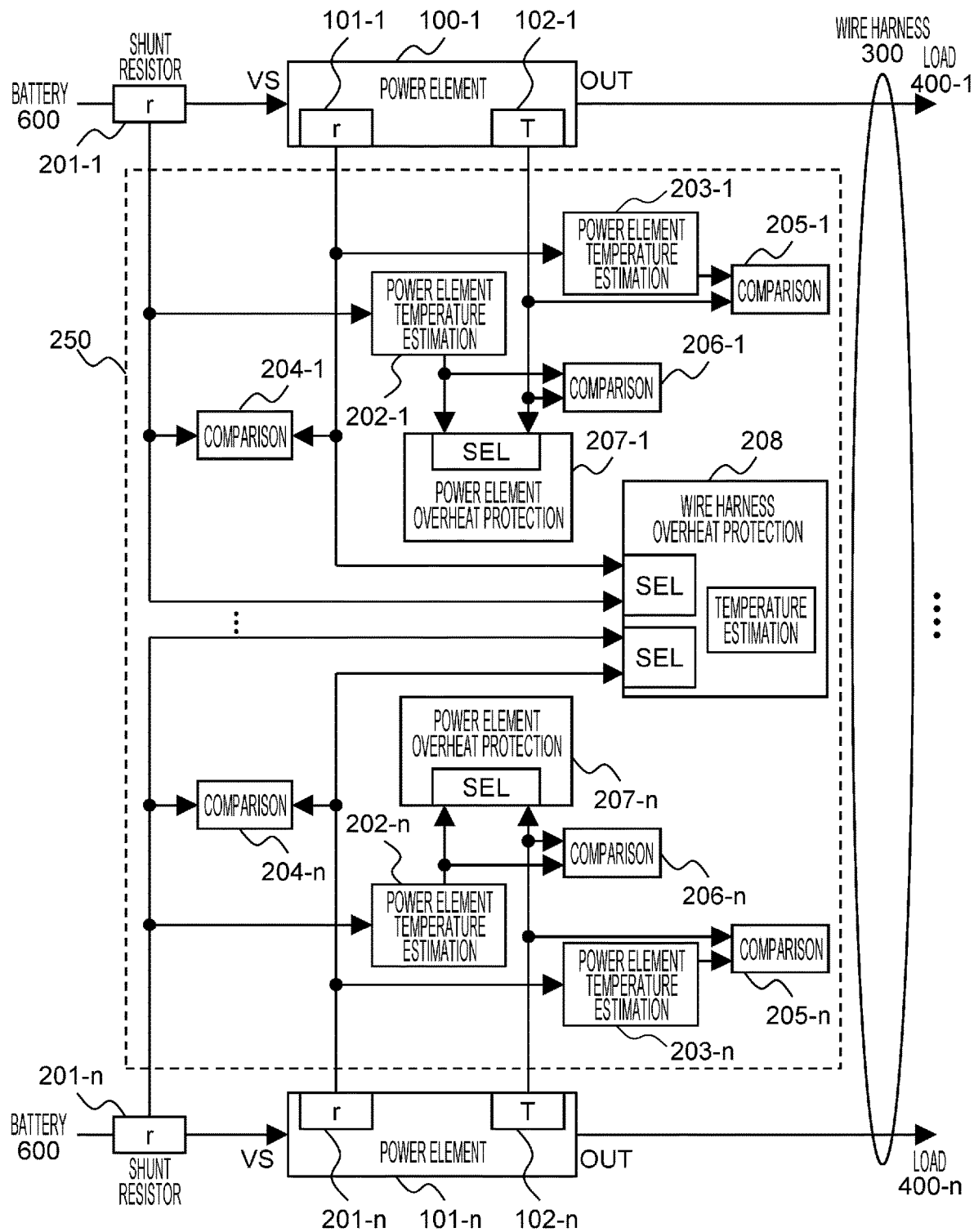
FIG. 5 is a diagram illustrating a configuration of an electronic control system by a microprocessor according to the first embodiment.

Note that the power element temperature estimating units 202-1 to 202-*n*, the power element temperature estimating units 203-1 to 203-*n*, the comparison units 204-1 to 204-*n*, the comparison units 205-1 to 205-*n*, the comparison units 206-1 to 206-*n*, the power element overheat protecting units 207-1 to 207-*n*, and the wire harness overheat protecting unit 208 can be realized by the microprocessor 250 and software executed by the microprocessor 250 as illustrated in FIG. 5.

According to the present embodiment, fail operational that can continue operation even if one sensor fails can be realized.

Second Embodiment

Figure 6:
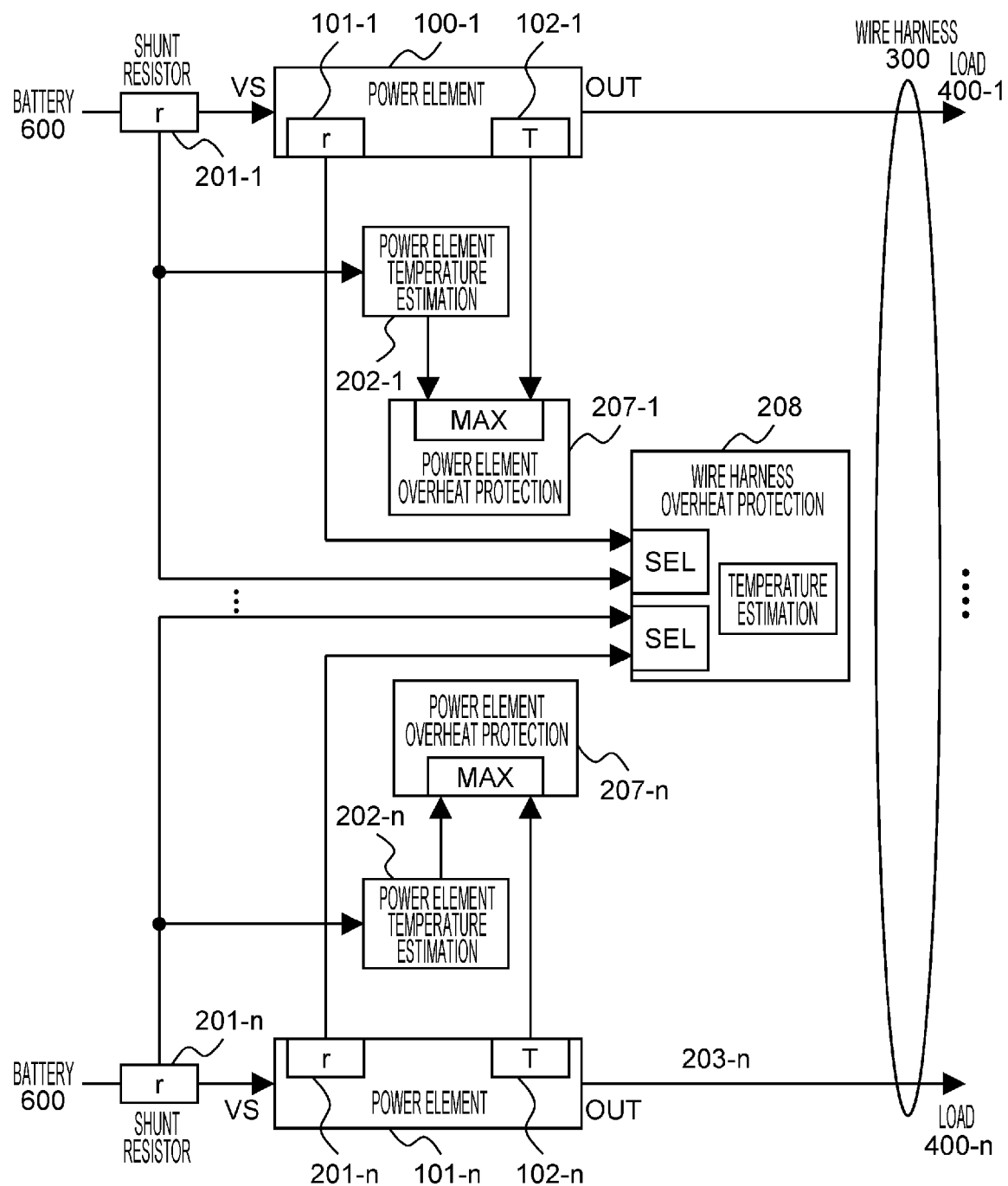
FIG. 6 is a diagram illustrating a configuration of an electronic control system according to a second embodiment.

FIG. 6 is a diagram illustrating a configuration of an electronic control system according to a second embodiment. In the second embodiment, a fail-safe that stops operation when an abnormality occurs is realized.

According to the present embodiment, the overheat protection operation of the power semiconductor elements 100-1 to 100-*n* and the wire harness 300 can be performed depending on the value of the normal sensor when a failure occurs in which any sensor outputs a value lower than the actual value of the current or the temperature. However, when a failure occurs in which any sensor outputs a value higher than the actual value of the current or the temperature, the current is cut off for preventive overheat protection. By this current cutoff, it is possible to avoid occurrence of a dangerous event such as overheating or smoking of the power semiconductor elements 100-1 to 100-*n* and the wire harness 300 due to sensor failure.

According to the present embodiment, fail operational cannot be realized, but fail safe can be realized without providing the power element temperature estimating units 203-1 to 203-n, the comparison units 204-1 to 204-n, the comparison units 205-1 to 205-n, and the comparison units 206-1 to 206-n.

The reason why the current sensors 201-1 to 201-n are used for the temperature estimation of the power semiconductor elements 100-1 to 100-n and the wire harness 300 instead of the current sensors 101-1 to 101-n incorporated in the power semiconductor elements 100-1 to 100-n is that since the current sensors 101-1 to 101-n and the temperature sensors 102-1 to 102-n are incorporated in the same power semiconductor elements 100-1 to 100-n, a common cause failure may occur.

Third Embodiment

Figure 7:
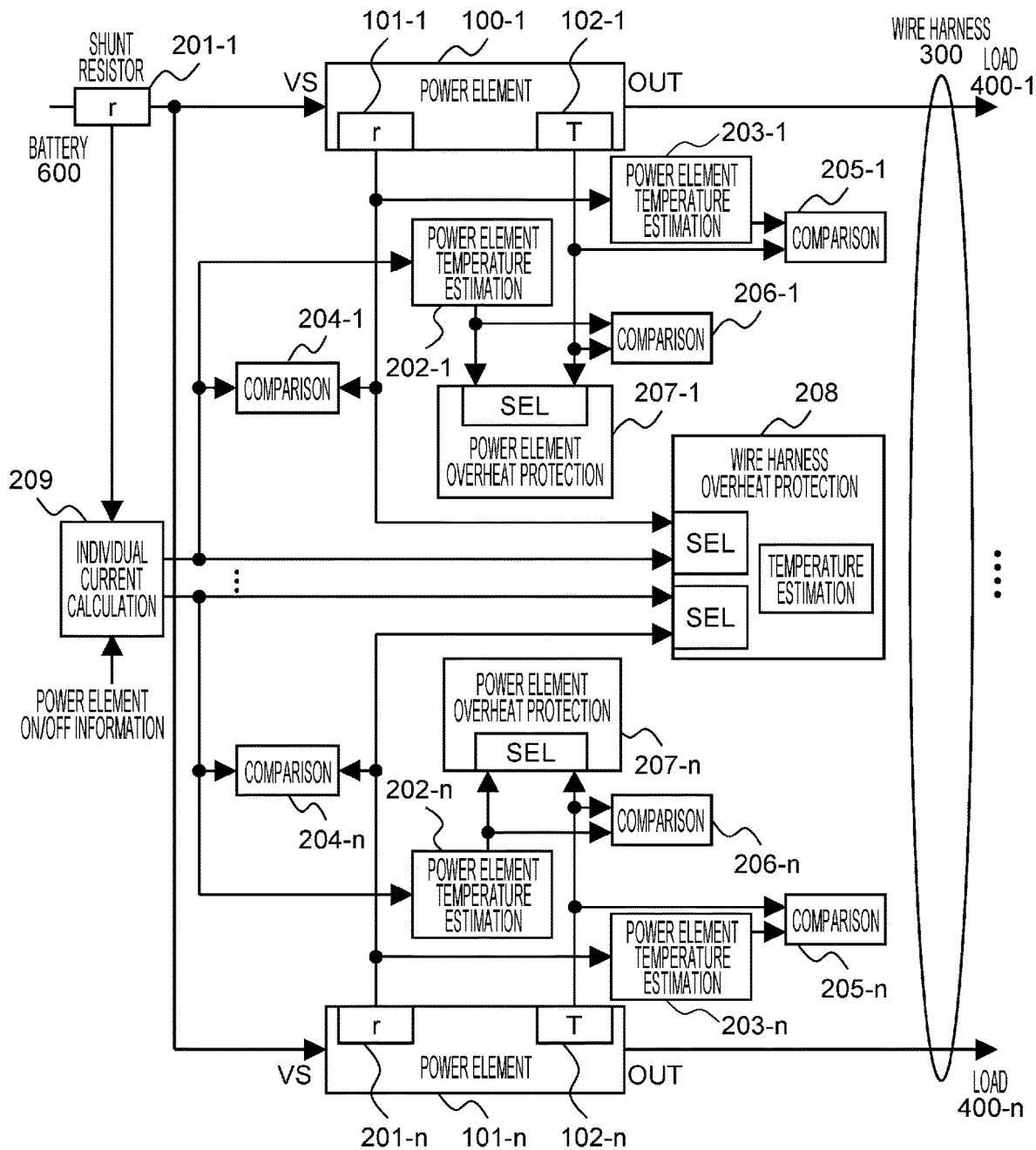
FIG. 7 is a diagram illustrating a configuration of an electronic control system according to a third embodiment.

FIG. 7 is a diagram illustrating a configuration of an electronic control system according to a third embodiment. In the third embodiment, the total current flowing through the power semiconductor elements 100-1 to 100-n is measured by a shunt resistor as the current sensor 201-1 to 201-n.

An individual current calculating unit 209 estimates individual currents flowing through the power semiconductor elements 100-1 to 100-n using the power element ON/OFF information, and operates the power element overheat protecting units 207-1 to 207-n and the wire harness overheat protecting unit 208.

FIG. 8 is a diagram illustrating an operation principle of the individual current calculating unit 209. For example, the change amount in the total current I_all when the j-th power semiconductor element 100-j changes from OFF to ON is the current I [j] flowing through the power semiconductor element 100-j. When the load of the power semiconductor element 100-j is pure resistance, the current changes stepwise as illustrated in (1). However, when the load of the power semiconductor element 100-j is an inductive load or a capacitive load, as illustrated in (2) or (3), the difference between the extension line of the current before the change of the ON/OFF information of the power semiconductor element 100-j and the current after the lapse of a predetermined time may be set as the current I[j] flowing through the power semiconductor element 100-j.

In addition, as illustrated in the upper row of FIG. 9, when the plurality of power semiconductor elements 100-1 to 100-n are simultaneously switched ON or OFF, the currents of the power semiconductor elements 100-1 to 100-n cannot be calculated. Therefore, as illustrated in the lower row of FIG. 9, it is preferable to turn ON or OFF the power semiconductor elements 100-1 to 100-n at different timings. Since a time resolution of 1 ms of current sampling can be easily realized by the current technology, for example, in a case where 10 power semiconductor elements are turned on/off, if one power semiconductor element is turned on/off every 1 ms, all the power semiconductor elements can be turned on/off in 10 ms, and even if it takes 10 ms to switch on/off all the power semiconductor elements, there is no practical problem.

Figure 10:
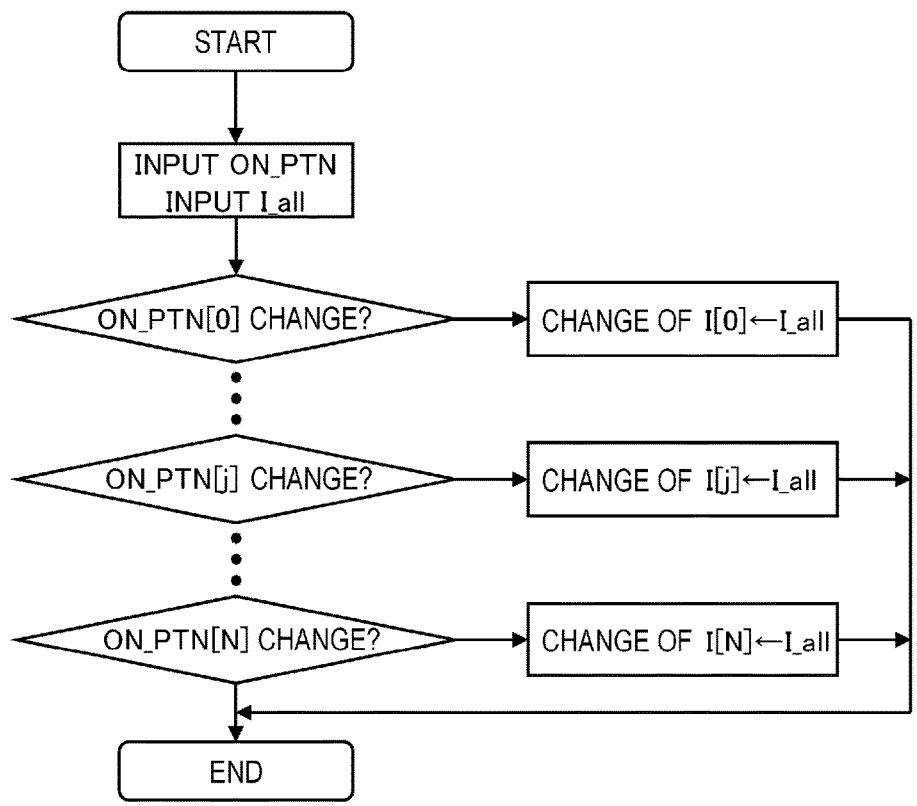
FIG. 10 is a flowchart of processing executed by an individual current calculating unit.

FIG. 10 is a flowchart of processing executed by the individual current calculating unit 209.

First, the individual current calculating unit 209 acquires the total current I_all calculated from the power element ON/OFF information ON_PTN[0] to ON_PTN[N] and the output value of the current sensor 201-1. Thereafter, the presence or absence of a change is specified from among the elements ON_PTN[0] to ON_PTN[N] of the power element ON/OFF information, and the change value of I_all is set as a current I[j] corresponding to the changed element ON_PTN[j].

Figure 11A:
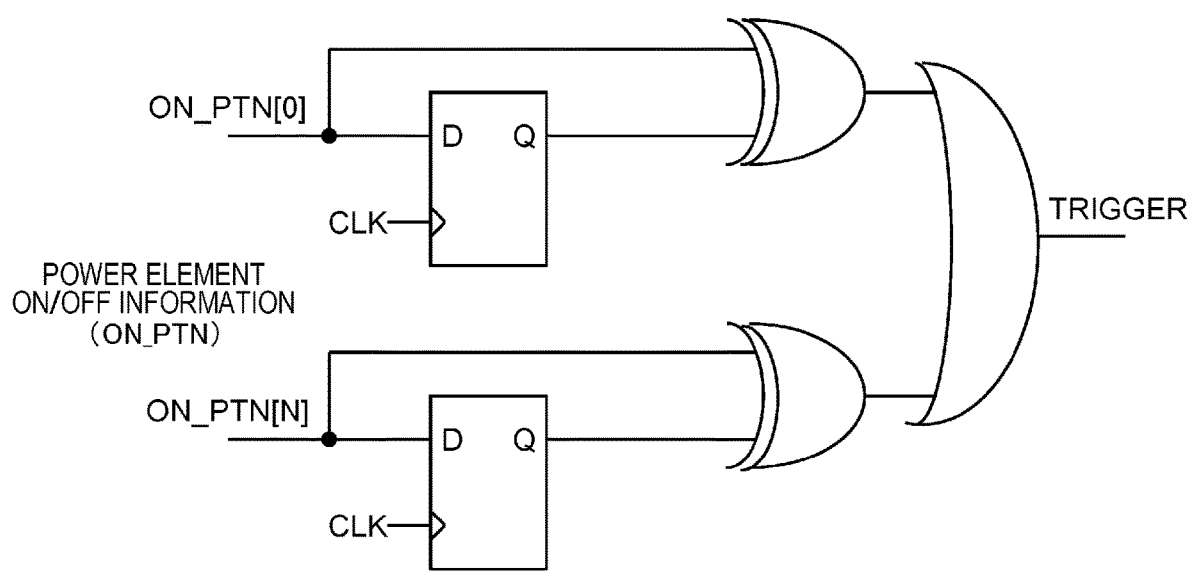
FIG. 11A is a diagram illustrating a hardware configuration of the individual current calculating unit.
Figure 11B:
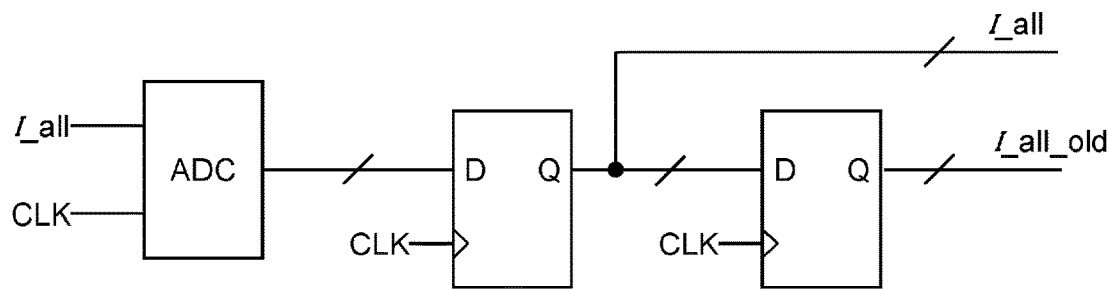
FIG. 11B is a diagram illustrating a hardware configuration of the individual current calculating unit.

FIGS. 11A and 11B are diagrams illustrating a hardware configuration for the individual current calculating unit 209 to detect a change point of the power element ON/OFF information. Each of ON_PTN[0] to ON_PTN[n] of the power element ON/OFF information is input to D-FF, and a value obtained by latching the D-FF for each clock CLK and ON_PTN[0] to ON_PTN[n] of the power element ON/OFF information are input to an exclusive OR (XOR). The output of the exclusive OR becomes H at the change point of ON_PTN[0] to ON_PTN[n] of the power element ON/OFF information. The TRIGGER signal is generated by logical sum (OR) of n outputs of the exclusive OR. The TRIGGER signal becomes H at any change point of ON_PTN[0] to ON_PTN[n] of the power element ON/OFF information.

In addition, when I_all is AD-converted at the timing of the clock CLK and input to the two-stage D-FF latched by the clock CLK, current I_all and I_all old one clock before are obtained. The difference between I_all at the timing when the TRIGGER signal becomes H and I_all old one clock before is the change value of I_all.

According to the third embodiment, the number of shunt resistors for current detection can be reduced, and the cost can be reduced.

Figure 12:
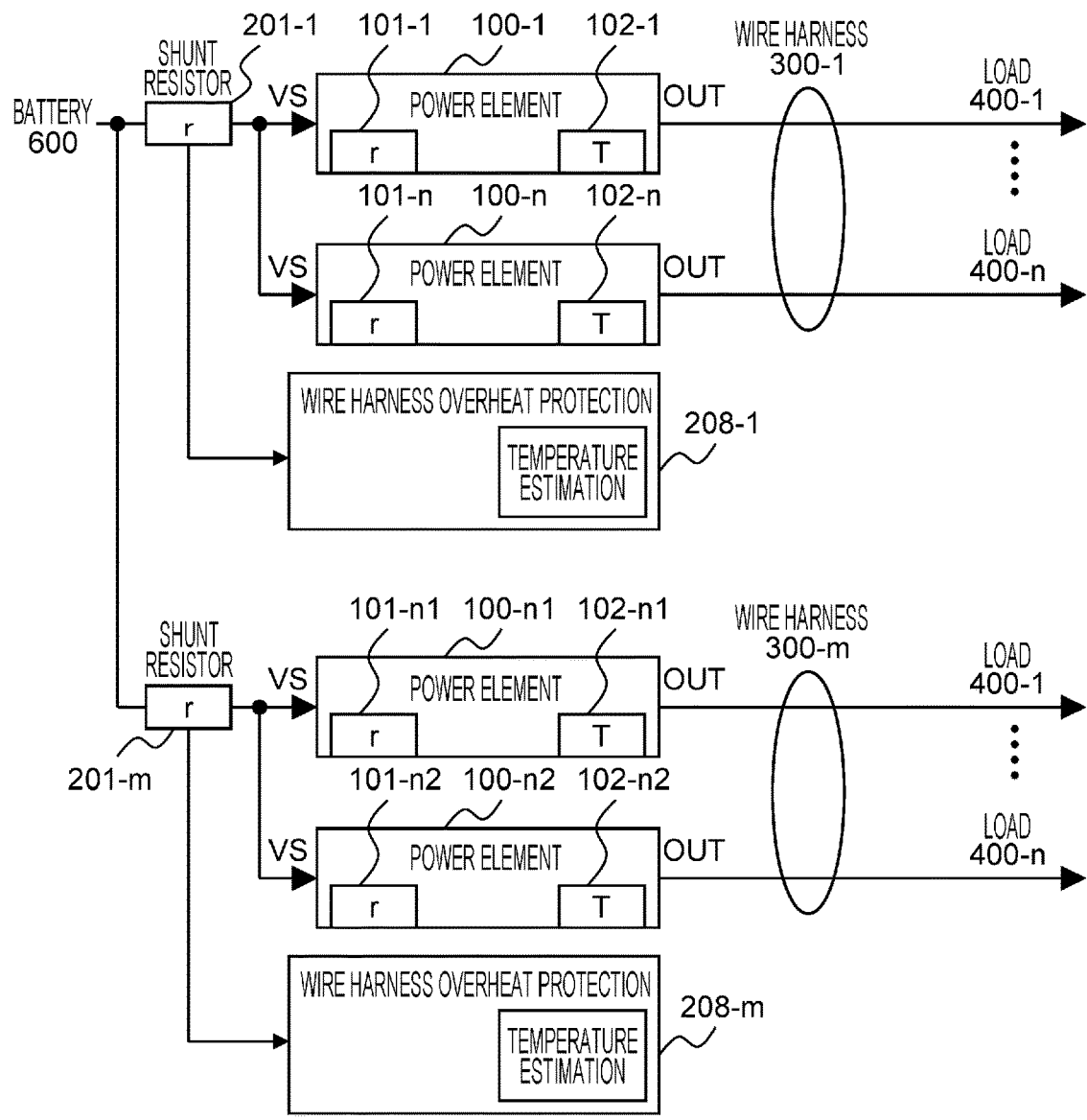
FIG. 12 is a diagram illustrating a configuration of a modification of the electronic control system according to the third embodiment.

FIG. 12 is a diagram illustrating a configuration of a modification of the electronic control system according to the third embodiment. In the present modification, shunt resistors as the current sensors 201-1 to 201-m are provided for respective wire harnesses 300-1 to 300-m. According to the present modification, by providing the shunt resistor for detecting the current for each of the wire harnesses 300-1 to 300-m, it is possible to reduce the number of shunt resistors for current detection and to reduce the cost. The individual current calculation error affects the temperature estimation error of each electric wire constituting the wire harnesses 300-1 to 300-m, but since the total value of the currents flowing through each of the wire harnesses 300-1 to 300-m of one bundle is equal to the current flowing through the shunt resistor, the temperature estimation error when the entire wire harness is regarded as a group of conductors does not become so large.

Figure 13:
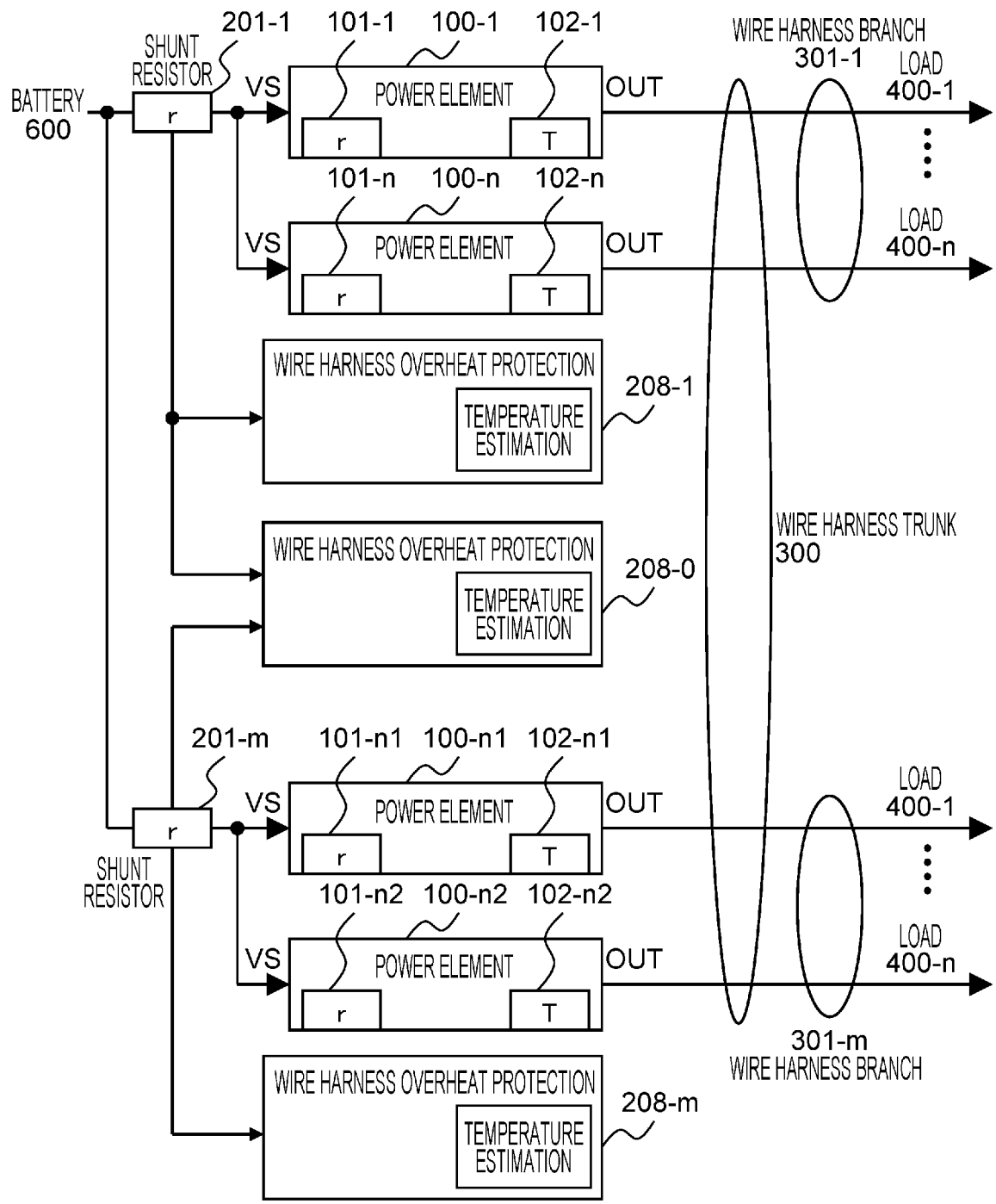
FIG. 13 is a diagram illustrating a configuration of a modification of the electronic control system according to the third embodiment.

FIG. 13 is a diagram illustrating a configuration of another modification of the electronic control system according to the third embodiment. In the present modification, shunt resistors as the current sensors 201-1 to 201-m are provided for the respective branched branches 301-1 to 301-m of the wire harness 300. According to the present modification, it is possible to reduce the number of shunt resistors for current detection and to reduce the cost. The individual current calculation error affects the temperature estimation error of each electric wire constituting the wire harness 300, but since the total value of the currents flowing through the branched branches 301-1 to 301-m is equal to the current flowing through the shunt resistor, the temperature estimation error when each branched branch is regarded as a group of conductors does not become so large.

Figure 14:
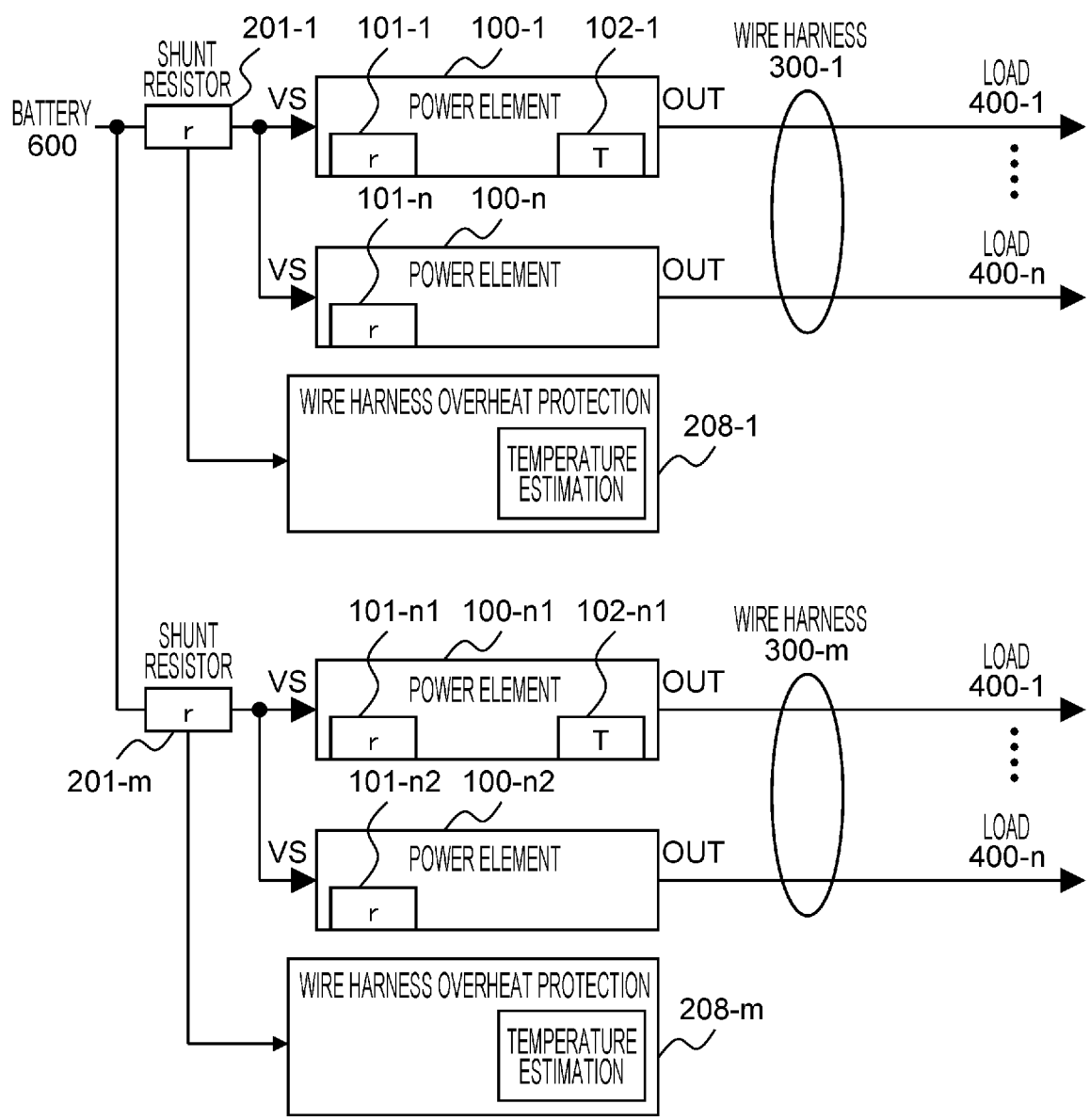
FIG. 14 is a diagram illustrating a configuration of a modification of the electronic control system according to the third embodiment.

FIG. 14 is a diagram illustrating a configuration of still another modification of the electronic control system according to the third embodiment. In the present modification, shunt resistors as the current sensors 201-1 to 201-m are provided for respective wire harnesses 300-1 to 300-m. Further, a temperature sensor is incorporated in some of the power semiconductor elements for each of the wire harnesses 300-1 to 300-m, and a temperature sensor is not incorporated in some of the power semiconductor elements. For example, among the power semiconductor element 100-1 and the power semiconductor element 100-*n* that cause a current to flow through the wire harness 300-1, the power semiconductor element 100-1 incorporates the temperature sensor 102-1, and the power semiconductor element 100-*n* does not incorporate the temperature sensor. Among the power semiconductor element 100-*n*1 and the power semiconductor element 100-*n*2 that cause a current to flow through the wire harness 300-*m*, the power semiconductor element 100-*n*1 incorporates the temperature sensor 102-1, and the power semiconductor element 100-*n*2 does not incorporate the temperature sensor. At this time, the temperature of the power semiconductor element 100-*n* not incorporating a temperature sensor is estimated by the temperature sensor 102-1 incorporated in the power semiconductor element 100-1, and the temperature of the power semiconductor element 100-*n*2 not incorporating a temperature sensor is estimated by the temperature sensor 102-*n*1 incorporated in the power semiconductor element 100-*n*1. Further, it is desirable that the power semiconductor element 100-1 incorporating a temperature sensor and the power semiconductor element 100-*n* not incorporating a temperature sensor are thermally coupled, and the power semiconductor element 100-*n*1 incorporating a temperature sensor 102-*n*1 and the power semiconductor element 100-*n*2 not incorporating a temperature sensor are thermally coupled. Specifically, it is desirable to arrange them close to each other on the printed circuit board, or thermally couple them using a print pattern as illustrated in FIGS. 15 and 16.

Figure 15:
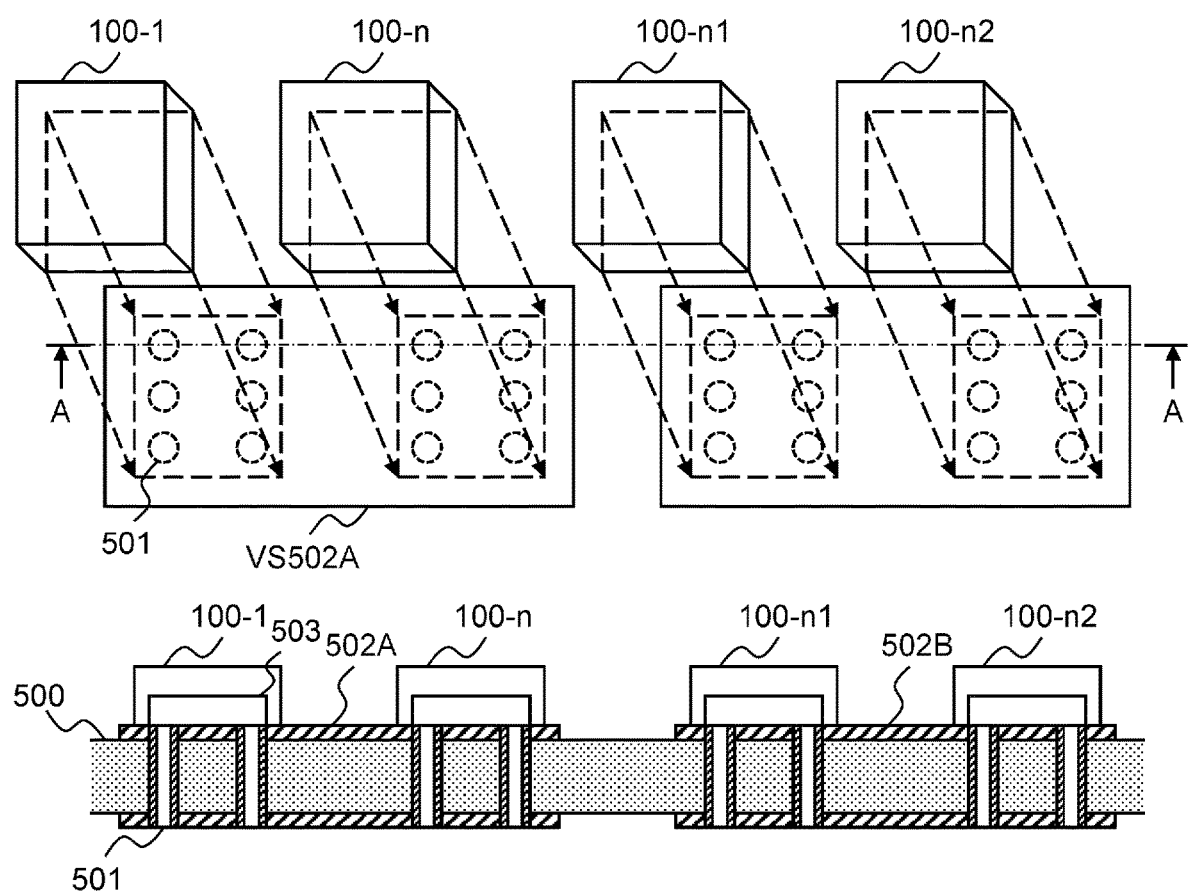
FIG. 15 is a diagram illustrating an example in which power semiconductor elements are thermally coupled and mounted on a printed circuit board.
Figure 16:
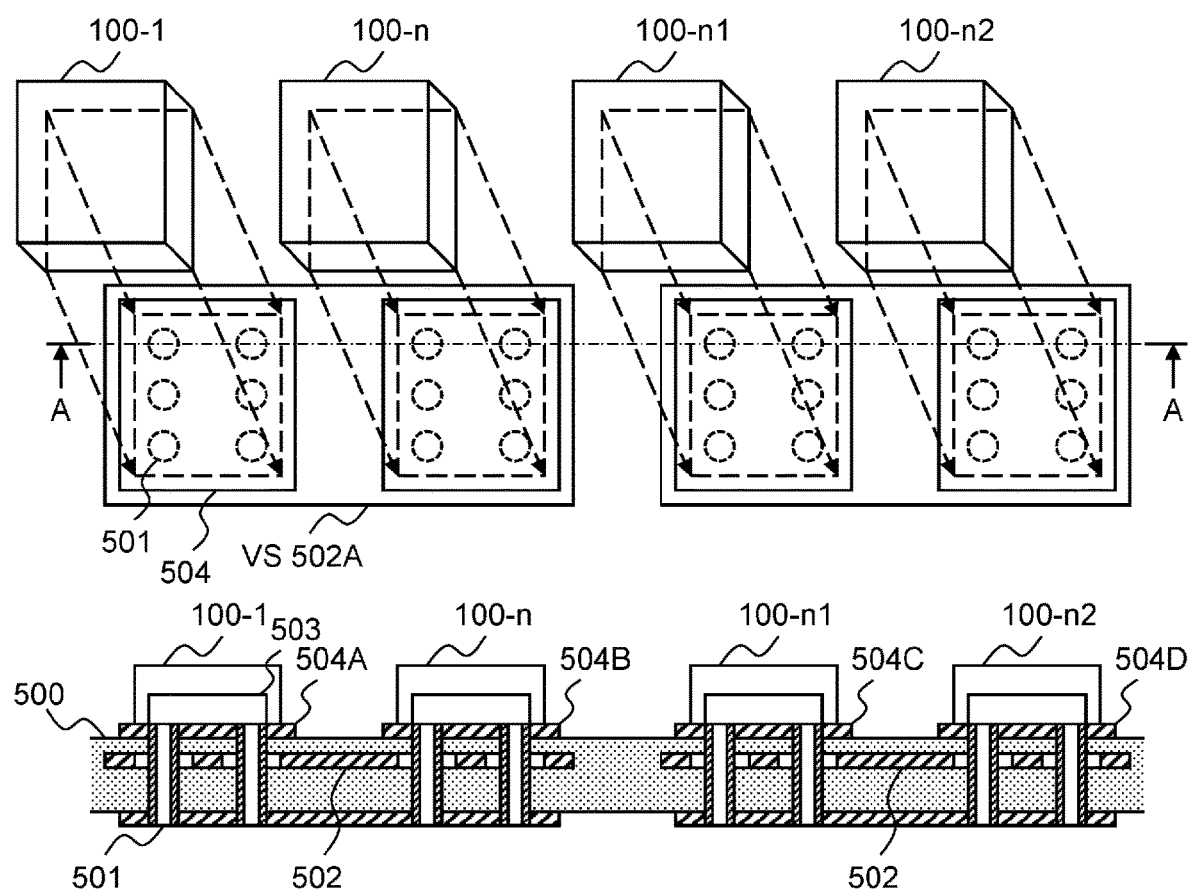
FIG. 16 is a diagram illustrating an example in which power semiconductor elements are thermally coupled and mounted on a printed circuit board.

FIGS. 15 and 16 are diagrams illustrating an example in which power semiconductor elements are thermally coupled and mounted on a printed circuit board. FIG. 15 is a front view and a cross-sectional view in a case where the power semiconductor elements are thermally coupled using the surface layer of the printed circuit board, and FIG. 16 is a front view and a cross-sectional view in a case where the power semiconductor elements are thermally coupled using the inner layer of the printed circuit board.

In the example illustrated in FIG. 15, a heat dissipation tab 503 on the back surface of each of the power semiconductor elements 100-1, 100-*n*, 100-*n*1, and 100-*n*2 and a VS electrode into which the current from the auxiliary battery 600 flows are connected, and the power semiconductor element 100-1 and the like are mounted on a printed circuit board 500. In this case, as can be seen from FIG. 14, since the power semiconductor element 100-1 and the like share the shunt resistors which are the current sensors 201-1 and 201-*m*, the VS electrodes can share one print pattern 502A and the like. Therefore, by soldering the heat dissipation tab 503 on the back surface of the power semiconductor element 100-1 and the heat dissipation tab 503 on the back surface of the power semiconductor element 100-*n* to the print pattern 502A, the two power semiconductor elements 100-1 and 100-*n* can be thermally coupled. Similarly, by soldering the heat dissipation tab 503 on the back surface of the power semiconductor element 100-*n*1 and the heat dissipation tab 503 on the back surface of the power semiconductor element 100-*n*2 to the print pattern 502B, the two power semiconductor elements 100-*n*1 and 100-*n*2 can be thermally coupled. Note that the common print pattern 502A and the like are preferably connected to the pattern on the back surface of the printed circuit board 500 via thermal via holes 501 and further connected to a heat sink (not illustrated) to improve the heat dissipation effect.

In the example illustrated in FIG. 16, the heat dissipation tab 503 on the back surface of each of the power semiconductor elements 100-1, 100-*n*, 100-*n*1, and 100-*n*2 is connected to an OUT electrode that supplies a current to a load. In this case, the heat dissipation tabs 503 on the back surfaces of the power semiconductor elements 100-1, 100-*n*, 100-*n*1, and 100-*n*2 are soldered to the separate print patterns 504A, 504B, 504C, and 504D, respectively, but are thermally coupled by the print pattern 502 of the inner layer of the printed circuit board 500. The print patterns 504A to 504D are preferably connected to the pattern on the back surface of the printed circuit board 500 via the thermal via holes 501, and further connected to a heat sink (not illustrated) to improve the heat dissipation effect.

According to the present modification, the power semiconductor elements 100-*n* and 100-*n*2 do not need to incorporate a temperature sensor, and a cheaper element can be used. Furthermore, since an interface for outputting information of the temperature sensor described in PTL 2 is not incorporated, the cost can be reduced as compared with the power semiconductor elements 100-1 and 100-*n*1. In particular, since the power semiconductor elements 100-1 and 100-*n*1 incorporate a complicated circuit described in PTL 2, it is necessary to mount the power semiconductor elements by a BCD (Bipolar, CMOS, DMOS) process, and thus manufacturing cost increases. In addition, since the DMOS constituting the BCD process has a horizontal structure, the ON resistance increases and the loss also increases. Since the power semiconductor elements 100-*n* and 100-*n*2 do not incorporate a complicated circuit, it is possible to adopt a MOSFET having a vertical structure with a small ON resistance, so that it is possible to reduce the cost and the loss.

Fourth Embodiment

Figure 17:
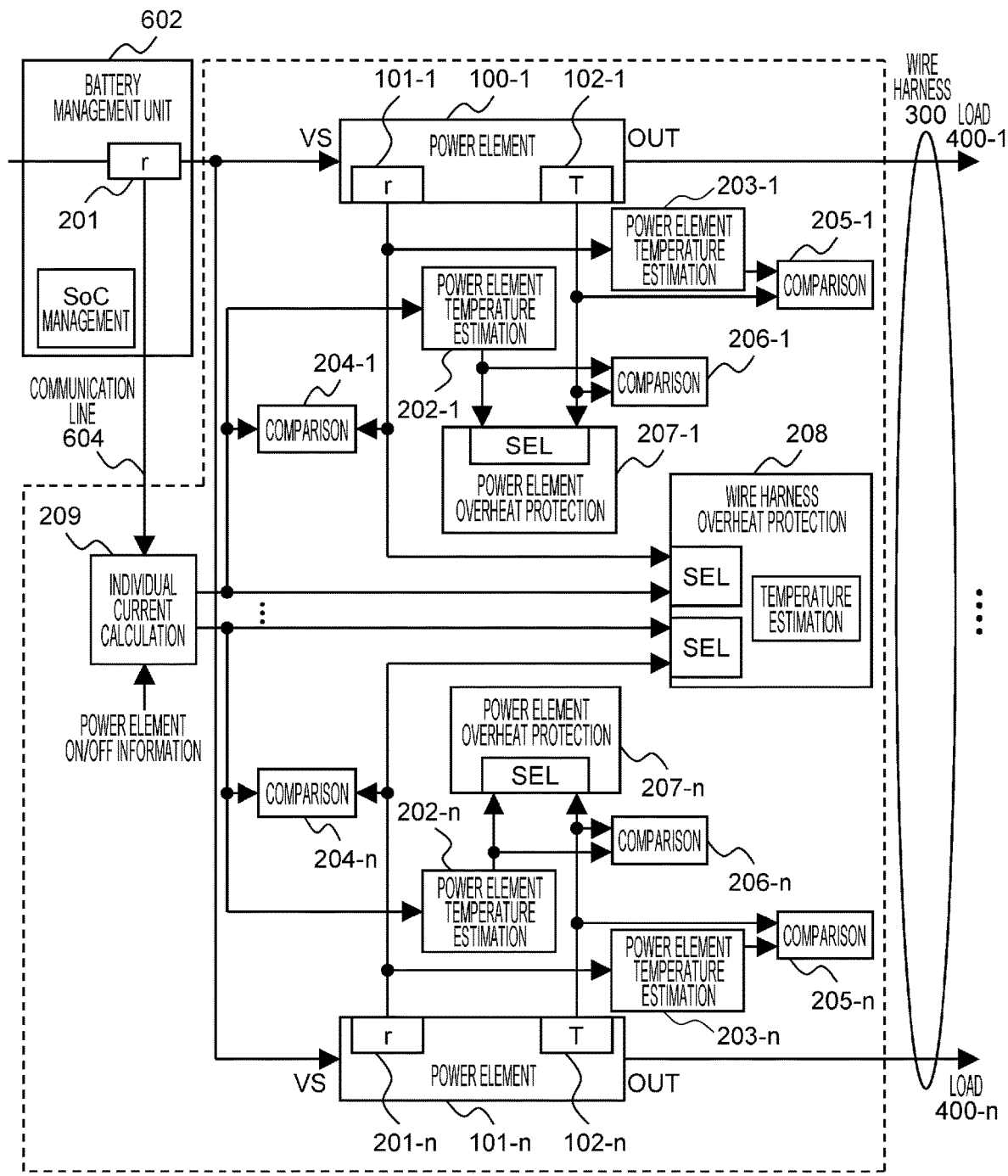
FIG. 17 is a diagram illustrating a configuration of an electronic control system according to a fourth embodiment.

FIG. 17 is a diagram illustrating a configuration of an electronic control system according to a fourth embodiment. In the present embodiment, the shunt resistor as a current sensor 201-1 that measures the total current flowing through the power semiconductor elements 100-1 to 100-*n* is also used as a sensor of a battery management unit 602. The battery management unit 602 includes a current sensor 201-1 to manage the SoC of the battery. The battery management unit 602 transmits the measurement result of the current sensor 201-1 to the electronic control unit via a communication line 604 such as CAN.

According to the present embodiment, the number of shunt resistors for current detection can be reduced, and the cost can be reduced.

Fifth Embodiment

Figure 18:
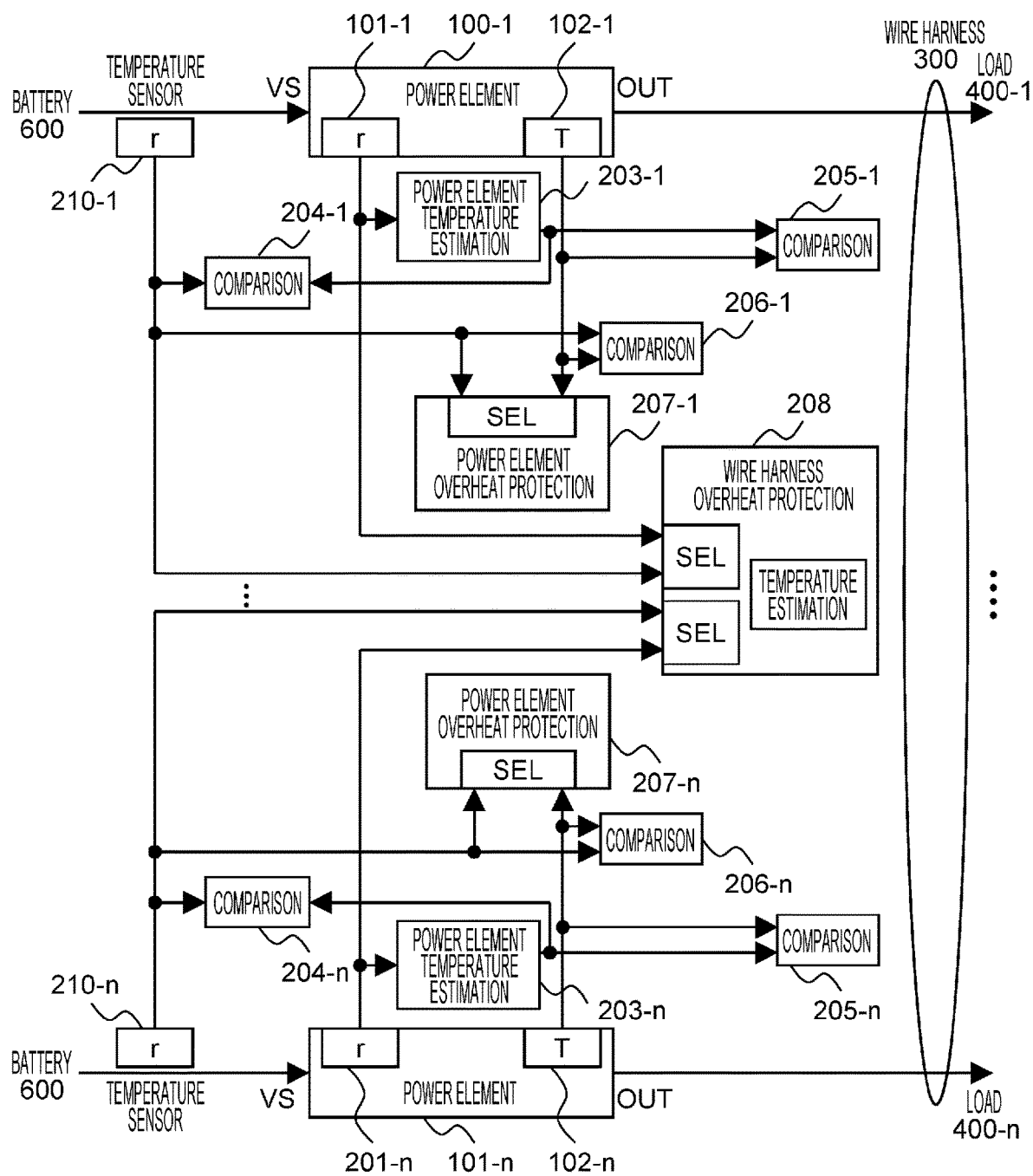
FIG. 18 is a diagram illustrating a configuration of an electronic control system according to a fifth embodiment.

FIG. 18 is a diagram illustrating a configuration of an electronic control system according to a fifth embodiment. In the present embodiment, temperature sensors 210-1 to 210-*n* are provided outside the power semiconductor elements 100-1 to 100-*n*.

The power element temperature estimating units 203-1 to 203-*n* estimate the temperatures of the power semiconductor elements 100-1 to 100-*n* using the outputs of the current sensors 101-1 to 101-*n* incorporated in the power semiconductor elements 100-1 to 100-*n*. The comparison units 204-1 to 204-*n* compare the outputs of the external temperature sensors 210-1 to 210-*n* with the temperatures estimated by the power element temperature estimating units 203-1 to 203-*n*. The comparison units 205-1 to 205-*n* compare the outputs of the built-in temperature sensors 102-1 to 102-*n* with the temperatures estimated by the power element temperature estimating units 203-1 to 203-*n*. The comparison units 206-1 to 206-*n* compare the outputs of the built-in temperature sensors 102-1 to 102-*n* with the outputs of the external temperature sensors 210-1 to 210-*n*.

The power element overheat protecting units 207-1 to 207-*n* select a temperature value estimated to be normal by a selection unit SEL on the basis of the comparison results by the comparison units 204-1 to 204-*n*, 205-1 to 205-*n*, and 206-1 to 206-*n*, and protect the power element from overheating. The wire harness overheat protecting unit 208 protects overheating of the wire harness 300 by selecting a temperature value estimated to be normal by the selection unit SEL on the basis of the comparison results by the comparison units 204-1 to 204-*n*, 205-1 to 205-*n*, and 206-1 to 206-*n*.

Specifically, the power element overheat protecting units 207-1 to 207-*n* notify a warning or reduce the output current when the input (actually measured value or estimated value of the temperature of the power semiconductor elements 100-1 to 100-*n*) selected by the selection unit SEL approaches a predetermined temperature, and cut off the current when the temperature exceeds the predetermined temperature. The wire harness overheat protecting unit 208 notifies a warning or reduces the output current when the estimated value of the temperature of the wire harness 300 based on the input (actually measured value of the current) selected by the selection unit SEL approaches a predetermined temperature, and cuts off the current when the temperature exceeds the predetermined temperature.

When the overheat protection of the power semiconductor elements 100-1 to 100-*n* is emphasized, the number of power element temperature estimating units can be reduced and the circuit scale can be reduced by externally attaching the temperature sensors 210-1 to 210-*n* to the outside of the power semiconductor elements 100-1 to 100-*n* as in the present embodiment. Furthermore, in a case where these processes are implemented by the microprocessor 250, the processing load of the microprocessor 250 can be reduced.

In addition, when the temperature of the wire harness 300 is estimated for overheat protection of the wire harness 300, since the outputs of the external temperature sensors 210-1 to 210-*n* or the outputs of the built-in temperature sensors 102-1 to 102-*n* are delayed due to thermal characteristics of the power semiconductor elements, it is desirable to preferentially use the outputs of the current sensors 101-1 to 101-*n* incorporated in the power semiconductor elements 100-1 to 100-*n* from the viewpoint of quick responsiveness. In addition, from the viewpoint of avoiding the same cause failure, it is desirable to select the external temperature sensors 210-1 to 210-*n* in preference to the built-in temperature sensors 102-1 to 102-*n*. Therefore, it is desirable to select the sensors A as the current sensors 101-1 to 101-*n*, the sensors B as the temperature sensors 210-1 to 210-*n*, and the sensors C as the temperature sensors 102-1 to 102-*n* by the algorithm illustrated in FIG. 3.

Figure 19:
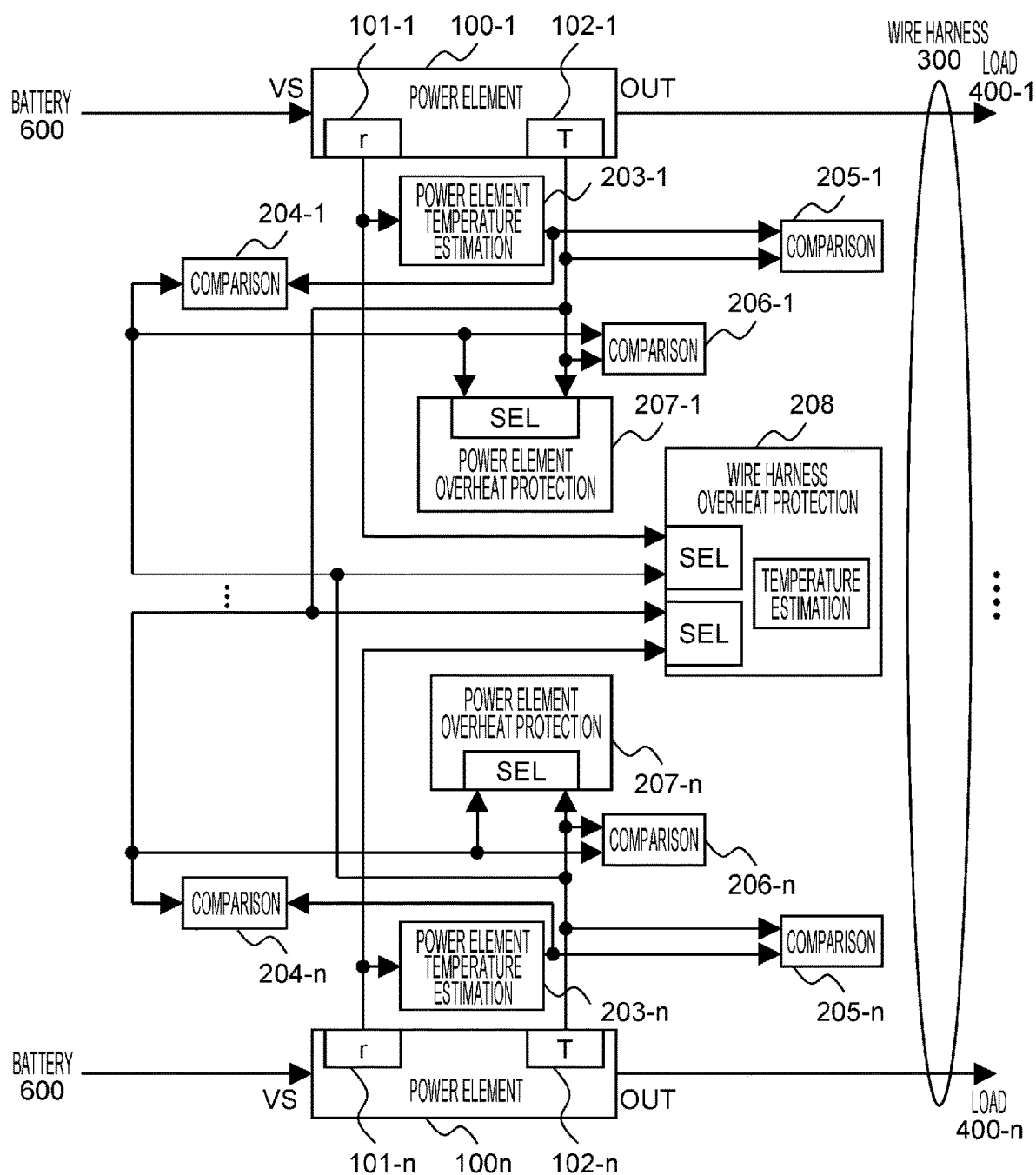
FIG. 19 is a diagram illustrating another configuration example of the electronic control system according to the fifth embodiment.

In addition, overheat protection of the power semiconductor elements 100-1 to 100-*n* can be performed by one external temperature sensor 210-1 by thermally coupling the power semiconductor elements 100-1 to 100-*n* according to the mounting method illustrated in FIGS. 15 and 16. At this time, the temperature sensors 102-1 to 102-*n* incorporated in the other power semiconductor elements 100-1 to 100-*n* may be used as the external temperature sensor 210-1. For example, in FIG. 19, the temperature sensor 102-1 incorporated in the power semiconductor element 100-1 can be used as an external temperature sensor of the power semiconductor element 100-*n*, and the temperature sensor 102-*n* incorporated in the power semiconductor element 100-*n* can be used as an external temperature sensor of the power semiconductor element 100-1.

Sixth Embodiment

Figure 20:
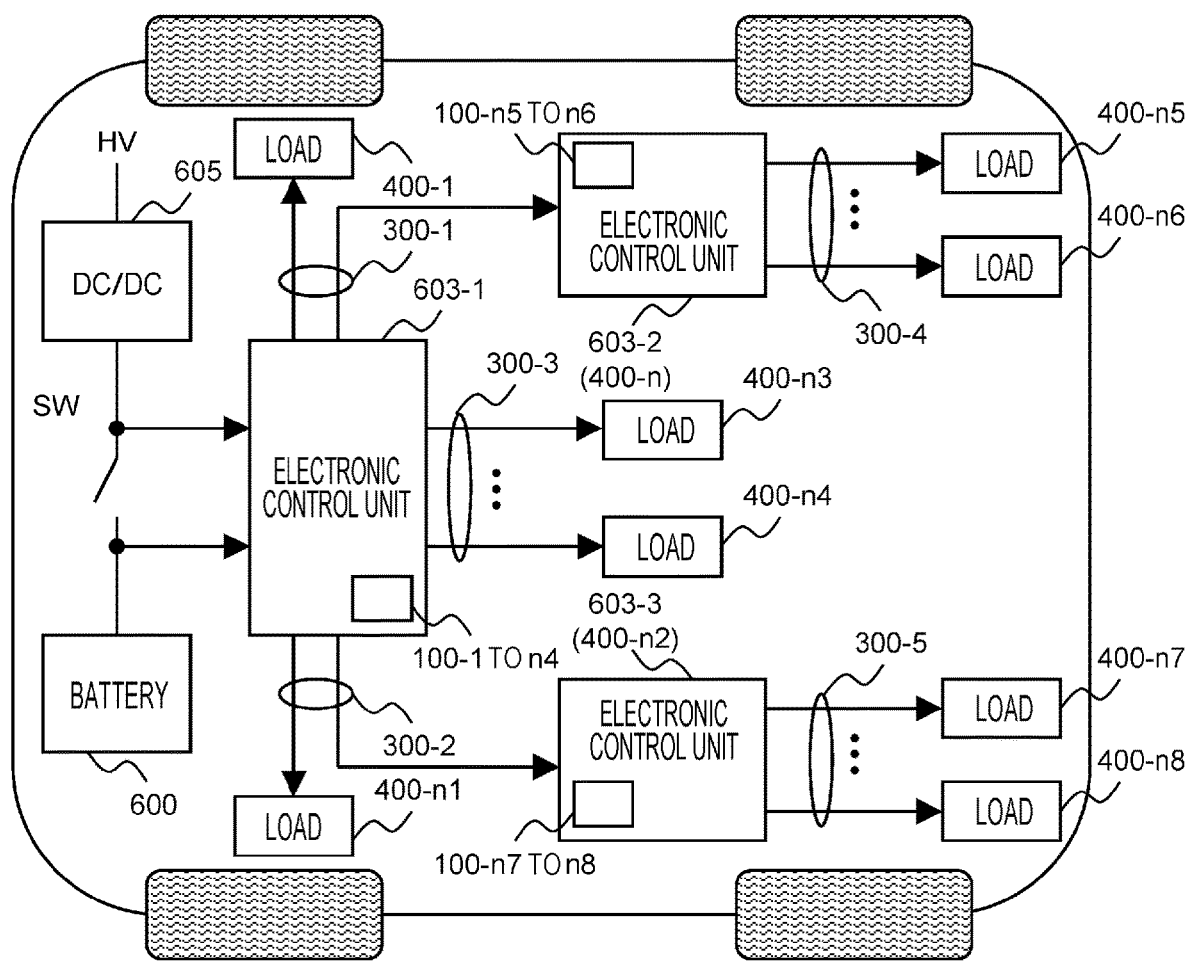
FIG. 20 is a configuration diagram of an electronic control system of the entire vehicle.

FIG. 20 is a configuration diagram of an electronic control system of the entire vehicle. The high-voltage power supply HV of the electric power train system is stepped down by a DC/DC converter 605, and charges the auxiliary battery 600 via a switch SW. Note that the switch SW is opened to separate the auxiliary battery 600 and the DC/DC converter 605 from each other in order to supply power to an electronic control unit 603-1 when the auxiliary battery or the DC/DC converter fails.

The electric power supplied to the electronic control unit 603-1 is distributed by the electronic control unit 603-1. For example, the electric power is distributed depending on the loads such that the power supplied from the DC/DC converter 605 is supplied to the loads 400-1 and 400-*n*, and the power supplied from the auxiliary battery 600 is supplied to the loads 400-*n*1 and 400-*n*2. The electronic control unit 603-1 controls and distributes power by overheat protection provided by the power semiconductor elements 100-1 to 100-*n*4, so that power is supplied to the loads 400-1 to 400-*n* via the wire harness 300-1, power is supplied to the loads 400-*n*1 to 400-*n*2 via the wire harness 300-2, and power is supplied to the loads 400-*n*3 to 400-*n*4 via the wire harness 300-3.

An electronic control unit 603-2, which is the load 400-*n* as viewed from the electronic control unit 603-1, similarly controls and distributes the power supplied from the electronic control unit 603-1 by overheat protection provided by the semiconductor switches 100-*n*5 to 100-*n*6, and supplies the power to the loads 400-*n*5 to 400-*n*6.

An electronic control unit 603-3, which is the load 400-*n*2 as viewed from the electronic control unit 603-1, similarly controls and distributes the power supplied from the electronic control unit 603-1 by overheat protection provided by the semiconductor switches 100-*n*7 to 100-*n*8, and supplies the power to the loads 400-*n*7 to 400-*n*8.

Note that the loads 400-1 to 400-*n*8 are various electrical components such as lights such as headlights and tail lights, electric brakes, electric brake boosters, solenoids, electric door mirrors, electric windows, electric fans, and electric pumps.

As described above, the electronic control system according to the embodiment of the present invention includes the first measurement unit (current sensor 101-1) that measures the current, the second measurement unit (temperature sensor 102-1) that measures the temperature, the third measurement unit (external current sensor 201-1 or external temperature sensor 210-1) that measures the current or the temperature, the power semiconductor element 100 that controls the power supply to the load, and the electronic control device (electronic control unit 603) that controls the operation of the power semiconductor element 100 using the measurement result by the first measurement unit 101-1, the second measurement unit 102-1, and the third measurement unit 201-1 or 209-1, in which at least a part of the power semiconductor element 100 incorporates the first measurement unit 101-1 and the second measurement unit 102-1, and the electronic control device 603 estimates the temperature from the measured value of the current (power element temperature estimating units 202-1 and 203-1), determines whether the first measurement unit 101-1, the second measurement unit 102-1, and the third measurement unit 201-1 or 210-1 are normal or abnormal (comparison units 204-1, 205-1, and 206-1) based on the measured value of the first measurement unit 101-1, the measured value of the second measurement unit 102-1, and the measured value of the third measurement unit 201-1 or 209-1, and detects abnormality of at least one of the power semiconductor element 100 and the wire harness 300 through which the output current of the power semiconductor element 101 flows according to the measurement result of the measurement unit determined to be normal, so that the power semiconductor element and the wire harness can be protected from overheating even when the sensor fails.

In addition, the third measurement unit (external current sensor 201-1) measures the current, and the electronic control device 603 compares the temperature estimated from the measured value of the current by the first measurement unit 101-1, the measured value of the temperature by the second measurement unit 102-1, and the temperature estimated from the measured value of the current by the third measurement unit 201-1 (comparison units 204-1, 205-1, and 206-1), and determines whether the first measurement unit 101-1, the second measurement unit 102-1, and the third measurement unit 201-1 are normal or abnormal, and therefore, it is possible to detect the abnormality of the power semiconductor element and the wire harness while suppressing the influence of the delay of the temperature rise due to the increase in the current.

In addition, the plurality of power semiconductor elements 100 are provided, the output current from the power semiconductor element 100 is supplied to the load via the wire harness 300 in which the plurality of conductors are bundled, and the electronic control device 603 estimates the temperature of the wire harness 300 from the measured value of the current of the power semiconductor element, so that the wire harness can be protected from heating.

In addition, the plurality of power semiconductor elements 100 include the first power semiconductor element 100-1 incorporating the second measurement unit 102-1 and the second power semiconductor element 100-n not incorporating the second measurement unit 102-1, and the first power semiconductor element 100-1 and the second power semiconductor element 100-n are thermally coupled. Therefore, a power semiconductor element not incorporating a temperature sensor can be used, and the on-resistance can be reduced.

In addition, since the thermal coupling is realized by the conductor pattern 502 connected to the first power semiconductor element 100-1 and the second power semiconductor element 100-n on the surface or the inner layer of the printed wiring board 500 on which the power semiconductor element 100 is mounted, it is not necessary to separately provide a member for thermal coupling, and the cost can be reduced.

In addition, since the third measurement unit 201-1 measures the current for each wire harness 300 or for each branch wire 300-1 or the like of the wire harness, it is not necessary to provide a current sensor for each electric wire of the wire harness, and the cost can be reduced.

In addition, since the change amount of the measured value of the current before and after the change in on/off of the plurality of power semiconductor elements 100 is estimated to be the current flowing through the power semiconductor element 100 in which on/off has changed, it is not necessary to provide a current sensor for each electric wire of the wire harness, and the cost can be reduced.

In addition, since the current value measured by the third measurement unit 201-1 is used for the charge amount management of battery (battery management unit 602), it is not necessary to separately provide a current sensor, and the cost can be reduced.

In addition, the third measurement unit 210 measures the temperature, and the electronic control device 603 compares the temperature estimated from the measured value of the current by the first measurement unit 101-1, the measured value of the temperature by the second measurement unit 102-1, and the measured value of the temperature by the third measurement unit 210 to determine whether the first measurement unit 101-1, the second measurement unit 102-1, and the third measurement unit 210 are normal or abnormal. Therefore, it is not necessary to separately provide an external sensor, and the cost can be reduced.

In addition, since the plurality of power semiconductor elements include the first power semiconductor element 100 and the second power semiconductor element 100-n, and the second measurement unit 102-1 incorporated in the first power semiconductor element 100 is used as the third measurement unit of the second power semiconductor element 100-n, it is not necessary to separately provide an external sensor, and the cost can be reduced.

In addition, the electronic control device includes a first electronic control device (electronic control unit 603-1) disposed on the front part of the vehicle, a second electronic control device (electronic control unit 603-2) disposed on the right side of the vehicle, and a third electronic control device (electronic control unit 603-3) disposed on the left side of the vehicle. The first electronic control device 603-1 supplies power supplied from the battery to at least the second electronic control device 603-2 and the third electronic control device 603-3 via the wire harnesses 300-1 and 300-2. The second electronic control device 603-2 and the third electronic control device 603-3 supply power supplied from the first electronic control device 603-1 to the load via the wire harnesses 300-4 and 300-5. Therefore, power can be distributed safely for each zone, and each wire harness can be protected.

Note that the present invention is not limited to the above-described embodiments, and includes various modifications and equivalent configurations within the spirit of the appended claims. For example, the above-described embodiments have been described in detail for easy understanding of the present invention, and the present invention is not necessarily limited to those having all the described configurations. Further, a part of the configuration of one embodiment may be replaced with the configuration of another embodiment. In addition, the configuration of another embodiment may be added to the configuration of a certain embodiment. In addition, a part of the configuration of each embodiment may be added, deleted, or replaced with another configuration.

In addition, a part or all of the above-described configurations, functions, processing units, processing means, and the like may be implemented by hardware by, for example, designing with an integrated circuit, or may be implemented by software by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, and a DVD.

Further, control lines and information lines indicate what is considered to be necessary for the description, and not all control lines and information lines in the product are necessarily shown. In practice, almost all configurations may be considered to be mutually connected.

The invention claimed is:

1. An electronic control system comprising:
a first measurement unit that measures current;
a second measurement unit that measures temperature;
a third measurement unit that measures current or temperature;
a power semiconductor element that controls power supply to a load; and
an electronic control device that controls an operation of the power semiconductor element by using measurement results of the first measurement unit, the second measurement unit, and the third measurement unit,
wherein at least a part of the power semiconductor element incorporates the first measurement unit and the second measurement unit, and
the electronic control device
estimates temperature from a measured value of the current,
determines whether the first measurement unit, the second measurement unit, and the third measurement unit are normal or abnormal on a basis of a measured value of the first measurement unit, a measured value of the second measurement unit, and a measured value of the third measurement unit, and
detects an abnormality of at least one of the power semiconductor element and a wire harness through which an output current of the power semiconductor element flows according to a measurement result of the measurement unit determined to be normal.

2. The electronic control system according to claim 1, wherein
the third measurement unit measures current, and
the electronic control device compares the temperature estimated from the measured value of the current by the first measurement unit, the measured value of the temperature by the second measurement unit, and the temperature estimated from the measured value of the current by the third measurement unit, and determines whether the first measurement unit, the second measurement unit, and the third measurement unit are normal or abnormal.

3. The electronic control system according to claim 2, wherein
a plurality of the power semiconductor elements are provided,
an output current from the power semiconductor element is supplied to a load via the wire harness in which a plurality of conductors are bundled, and
the electronic control device estimates temperature of the wire harness from a measured value of a current of the power semiconductor element.

4. The electronic control system according to claim 3, wherein
the plurality of power semiconductor elements include a first power semiconductor element incorporating the second measurement unit and a second power semiconductor element not incorporating the second measurement unit, and
the first power semiconductor element and the second power semiconductor element are thermally coupled.

5. The electronic control system according to claim 4, wherein the thermal coupling is realized by a conductor pattern connected to the first power semiconductor element and the second power semiconductor element on a surface or an inner layer of a printed wiring board on which the power semiconductor element is mounted.

6. The electronic control system according to claim 3, wherein the third measurement unit measures the current for each wire harness or for each branch wire of the wire harness.

7. The electronic control system according to claim 6, wherein a change amount of a measured value of the current before and after a change in on/off of the plurality of power semiconductor elements is estimated as a current flowing through the power semiconductor element in which the on/off is changed.

8. The electronic control system according to claim 6, wherein the current value measured by the third measurement unit is used for battery charge amount management.

9. The electronic control system according to claim 1, wherein
the third measurement unit measures temperature, and
the electronic control device compares the temperature estimated from the measured value of the current by the first measurement unit, the measured value of the temperature by the second measurement unit, and the measured value of the temperature by the third measurement unit, and determines whether the first measurement unit, the second measurement unit, and the third measurement unit are normal or abnormal.

10. The electronic control system according to claim 9, wherein
the plurality of power semiconductor elements include a first power semiconductor element and a second power semiconductor element, and
the second measurement unit incorporated in the first power semiconductor element is used as a third measurement unit of the second power semiconductor element.

11. The electronic control system according to claim 1, wherein
the electronic control device includes a first electronic control device disposed at a vehicle front portion, a second electronic control device disposed on a vehicle right side, and a third electronic control device disposed on a vehicle left side,
the first electronic control device supplies electric power supplied from a battery to at least the second electronic control device and the third electronic control device via the wire harness, and
the second electronic control device and the third electronic control device supply power supplied from the first electronic control device to a load via the wire harness.

12. An electronic control device comprising:
a first measurement unit that measures current;
a second measurement unit that measures temperature;
a third measurement unit that measures current or temperature; and
a power semiconductor element that controls power supply to a load, wherein
at least a part of the power semiconductor element incorporates the first measurement unit and the second measurement unit, and
the electronic control device
controls an operation of the power semiconductor element by using measurement results of the first measurement unit, the second measurement unit, and the third measurement unit,
estimates temperature from a measured value of current, determines whether the first measurement unit, the second measurement unit, and the third measurement unit are normal or abnormal on a basis of a measured value of the first measurement unit, a measured value of the second measurement unit, and a measured value of the third measurement unit, and detects an abnormality of at least one of the power semiconductor element and a wire harness through which an output current of the power semiconductor element flows according to a measurement result of the measurement unit determined to be normal.

13. The electronic control device according to claim 12, wherein the third measurement unit measures current, and the electronic control device compares the temperature estimated from the measured value of the current by the first measurement unit, the measured value of the temperature by the second measurement unit, and the temperature estimated from the measured value of the current by the third measurement unit, and determines whether the first measurement unit, the second measurement unit, and the third measurement unit are normal or abnormal.

14. The electronic control device according to claim 12, wherein the third measurement unit measures temperature, and the electronic control device compares the temperature estimated from the measured value of the current by the first measurement unit, the measured value of the temperature by the second measurement unit, and the measured value of the temperature by the third measurement unit, and determines whether the first measurement unit, the second measurement unit, and the third measurement unit are normal or abnormal.

* * * * *